United States Patent Office 2,860,372
Patented Nov. 18, 1958

2,860,372

MEANS FOR JOINTING THERMOPLASTIC SYNTHETIC RESIN PIPES, PIPE FITTINGS AND THE LIKE

Sidney Edward Youthed, Totteridge, London, England, assignor to J. S. & F. Folkard Limited, Edgware, Middlesex, England, a company of Great Britain Original application December 10, 1956, Serial No. 627,337. Divided and this application July 22, 1957, Serial No. 673,373

Claims priority, application Great Britain April 16, 1956

6 Claims. (Cl. 18—1)

This invention relates to an improved means for jointing pipes, pipe fittings and like members made of thermoplastic synthetic resin material such as polythene, polyethylene or any other synthetic resin having similar heat reaction and utilising a spigot and socket type joint. A main object of the invention is to enable such joints to be effected efficiently and expeditiously without weakening the material at the joint.

Accordingly the invention provides means for jointing pipes, pipe fittings and like members made of thermoplastic synthetic resin material such as polythene or polyethylene and having one member and to be jointed formed as a socket and the other as a spigot, said means including a heat conducting tool incorporating plug and collar parts shaped respectively to enter the socket and to receive the spigot, the outer surface of said plug part and the inner surface of said collar part being peripherally recessed to permit slight bellying of the spigot and socket walls during the heating operation. The plug and collar parts of the tool are also provided with sizing lips at the leading ends which serve to heat up and size the respective spigot and socket surfaces which are caused to slide thereover on engagement with the tool and which also serve to clean said surfaces on withdrawal from the tool.

Figure 1:
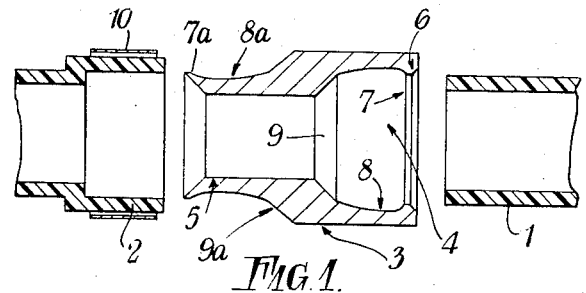
Figure 5:
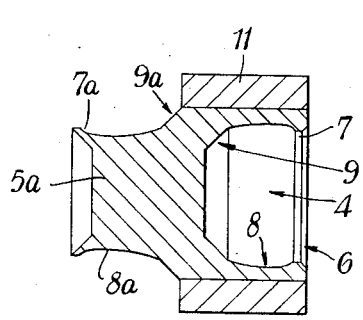
Figure 6:
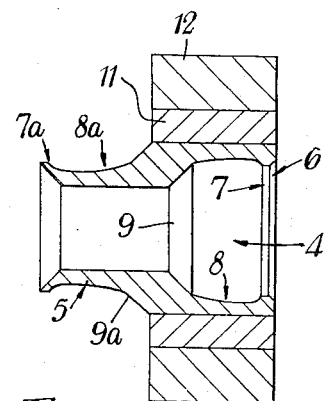
Figure 2:
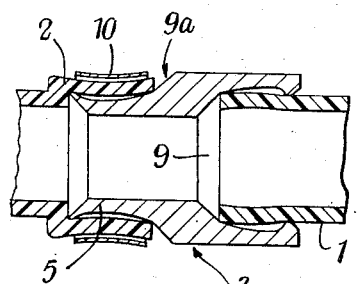
Figure 3:
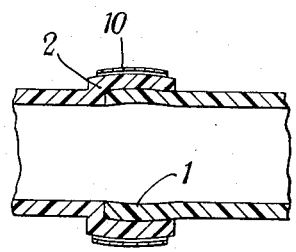
Figure 4:
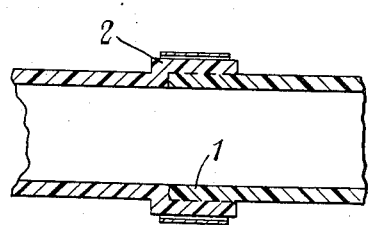

In order that the invention may be clearly understood and readily carried into effect a jointing method and several embodiments of the jointing means will now be described in detail with reference to the accompanying drawings in which:

Figure 1 is an exploded sectional view showing an end of a pipe forming a spigot, an end of a pipe fitting formed into a socket and a basic form of heating tool means, Figure 2 is a view similar to Figure 1 but shows the spigot and socket engaged with the tool and slightly bellied under applied heat, Figure 3 is a sectional view showing the spigot and socket of Figure 2 after they have been withdrawn from the tool and first mated together, the distortion which takes place being slightly exaggerated for illustrative purposes, Figure 4 is a cross-sectional view similar to Figure 3 but showing the jointed spigot and socket after cooling, Figure 5 shows one modified form of tool in cross-sectional elevation, and Figure 6 is a view similar to Figure 5 but showing a further tool modification.

Referring now to the drawings, Figures 1 to 4 show an embodiment of the invention applied to the jointing of a spigot 1, constituted by the terminal end of a polythene or polyethylene pipe, with a socket 2 which is made of similar material and is provided in known manner on the end of a pipe fitting. Alternatively, the socket could be provided on another pipe, a junction piece or any other similar member. For the purpose of heating the appropriate surfaces of the spigot 1 and socket 2 a tool 3 is provided which may be made of steel or other heat conducting material. The tool 3 has an annular cross-section and is provided at one end with a collar 4 for accommodating the spigot 1 and, at the other end, with a hollow plug 5 which fits into the socket 2.

The mouth of the tool collar 4 is chamferred at 6 to provide a lead in for the spigot 1 and, immediately behind the chamfer 6, the collar mouth is provided with an inwardly directed sizing lip 7 having a narrow cylindrical surface the diameter of which is equal to the required external diameter of the spigot 1. Behind the lip 7, the tool collar has its internal surface peripherally recessed at 8, the floor of the recess 8 being in the shape of a parabolic curve in cross-section, or in any other appropriate shape, and the internal diameter of the inner end of the recess being again equal to the internal diameter of the lip 7. Beyond the inner end of the recess 8, the collar has a frusto-conical wall part 9 which converges away from the collar mouth at an angle of some 45° to the longitudinal tool axis.

The external surface of the tool plug part 5 is shaped similarly to the internal surface of the collar 4 but in a reverse manner, there being an outwardly directed sizing lip 7a provided around the leading plug end followed by an external peripheral recess 8a and a frusto-conical divergent wall portion 9a. The plug lip 7a has an external diameter which equals the desired internal diameter of the socket 2 and is such that, when the spigot 1 and socket 2 are correctly sized by the respective lips they can mate together as a sliding fit.

Prior to the formation of a joint, a flexible band 10 is fitted around the outside wall surface of the socket 2 so as to exert a radially compressive force on the socket in the inward direction.

For the purpose of forming the joint, the tool 3 is heated by a blow lamp, gas torch or in any other convenient manner to a temperature of at least 350° C. and which can rise as high as 500° C. When the tool is sufficiently heated, the socket 2 is first applied to the plug part 5 of the tool and pushed home until the rim of the socket reaches the apex of the outwardly convergent plug wall portion 9a which serves as a stop and also to centralise the socket on the plug. As the socket is pushed home on to the plug it slides progressively over the plug lip 7a and this lip is sufficiently hot to melt the inner wall surface of the thermo-plastic socket. As a result of such melting, any excess material is pushed away in molten form so that the internal socket diameter becomes accurately sized. As soon as the socket has been positioned on the tool plug, the spigot 1 is introduced into the tool collar 4, the outer spigot diameter again being accurately sized by the lip 7 and the spigot being finally stopped and centred in the tool collar due to the spigot end contacting the wider end of the frusto-conical portion 9 within the tool collar.

The spigot and socket are left engaged with the tool for a pre-determined time, not exceeding a few seconds, further heat being in the meantime applied by radiation to those portions of the already melted spigot and socket surfaces which are located opposite the recesses 8 and 8a. As a result of this reflected heat, the inserted spigot 1 tends to expand naturally as it begins to soften and takes up a slightly outwardly bellied form. The reflected heat on the socket 2 also causes the socket wall to soften but, due to the action thereon of the compression band 10, the socket will tend to belly inwards slightly. An indication of the shapes taken by the spigot and socket after heating is clearly shown in Figure 2.

As soon as the spigot and socket have absorbed sufficient heat and have become sufficiently molten on the surfaces which are to be fused together, they are withdrawn simultaneously from the tool 3. This withdrawal movement over the heated lips 7 and 7a serves slightly to scrape the molten surfaces and automatically remove therefrom any oxidation leaving the surfaces clean and free to amalgamate.

As previously mentioned, the socket 2 is applied to the tool 3 immediately before the spigot 1 so that the socket wall is in a slightly softer condition than the spigot when the socket and spigot are simultaneously withdrawn from the tool. The socket and spigot are next mated together, as shown in Figure 3, the spigot, due to its somewhat greater rigidity, tending to push the socket wall outwards as it penetrates, whilst the outer compression band 10 resists such outward pressure. As a result, the outer spigot wall and inner socket wall are held firmly under compression over the whole area of the molten surfaces. The behaviour of the thermoplastic material of which the spigot and socket are made is such that it accepts the heat on the surface but, being a bad conductor, allows the heat to penetrate only slowly through its molecular structure. In consequence, the area of the joint tends, for a short period, to increase in softness which facilitates the compressive action of the outer band and retains complete density.

As the heat dissipates, the spigot and socket contract to their normal shape as shown in Figure 4, but here again the compression which the ring 10 exerts on the socket ensures that the area of the joint remains under compression until the joint is completed.

The provision of the frusto-conical portions 9, 9a within the tool collar and around the tool plug is important in that the edges of the spigot and socket are thereby maintained out of contact with the tool body during the heating operation. As a result these edges do not melt during heating but remain comparatively rigid. There is thus no fear of burrs being thrown out when the two edges meet in the mating position of the spigot and socket to cause obstructions within the bore.

The basic form of tool shown in Figures 1 and 2 may be modified in various ways and one such embodiment is illustrated in Figure 5. The main difference in this last-mentioned embodiment is that the plug part 5a of the tool is solid and a heat retaining ring 11 is applied to the outside wall of the collar part 4. This retaining ring 11 serves to conserve heat and also ensures a much more even dispersion of heat through the material. It is thus very suitable for use in cold northern countries and cold outdoor conditions. The ring 11 can be made of any material chosen to suit desired conditions and which differs from the material of which the tool is made.

In Figure 6 there is illustrated yet another embodiment of the tool shown in Figures 1 and 2, the difference in this case being that a heat retaining ring 11 is applied to the wall of the tool collar 4 and a circular electrically operable heating element 12 is applied externally to the ring 11. In this embodiment it should be noted that the tool plug part 5 is hollow but it will be appreciated that any of the plug parts in the illustrated tools could be solid or hollow as conditions demand.

All the tool forms illustrated are of one piece construction and they may have a handle applied thereto for facilitating manual manipulation. Similarly any of the tools may be provided with a stem which could be mounted in a vice or a self-supporting stand or any other similar supporting device. The tools may also be made with the collar and plug parts separate and adapted for screwed connection or they could be applied to a central circular flange for heat conservation. Also the tool parts could be mounted on a flat electrically heated platen, or in an appropriate box-like fitting containing or adapted to receive a suitable heat source.

In regard to the various operative surfaces of the tool it will be appreciated that the lips 7, 7a may be integral or alternatively may be made detachable either for the purpose of cleaning or to permit interchanging to accommodate slightly different sizes of plug and socket. In the same way the recessed radiant heat surfaces of the tool may be lined and made detachable either for purposes of cleaning or to permit the use of a material such as copper or Phosphor bronze which gives a greater reflection of heat due to its high conductive capacity and resistance to corrosive action.

I claim:

1. Means for use in jointing pipes, pipe fittings and like members made of thermo-plastic synthetic resin material such as polythene and having one member end to be jointed formed as a socket and the other as a spigot, said means including a heat conducting tool incorporating plug and collar parts dimensioned respectively to fit into said socket and to fit over said spigot and having the outer surface of said plug part and the inner surface of said collar part peripherally recessed to permit slight bellying of the spigot and socket walls during a heating operation, and sizing lips which are provided respectively around the external leading end of said plug part and the internal leading end of said socket part, said lips being adapted to heat up and size the respective socket and spigot surfaces which are caused to slide thereover on engagement with the tool parts and also to clean said surfaces on withdrawal from the tool parts.

2. Means as claimed in claim 1 in which the floors of said plug and collar recesses are of substantially parabolic form in cross-section, there being a convergent frusto-conical wall part into which the inner end of the collar recess merges and which makes line contact only with an inserted spigot end to stop and centre the latter, and there being a divergent frusto-conical wall part into which the inner end of said plug recess merges and which similarly makes line contact only with the leading end edge of an engaged socket.

3. Means as claimed in claim 2 in which the frusto-conical wall parts of the collar and plug respectively are inclined approximately at an angle of some 45° to the horizontal axis of the tool.

4. Means as claimed in claim 1 further including an outer heat retaining ring applied to the collar part of the tool.

5. Means as claimed in claim 4 further including an encircling electric heating element surrounding the heat retaining ring.

6. Means as claimed in claim 1 in which the plug and collar parts of the tool are separate and adapted for screwed engagement.

References Cited in the file of this patent

UNITED STATES PATENTS 2,142,150    Replogle _____ Jan. 3, 1939